C. MONSON.
Gas Bracket.
No. 39,945. Patented Sept. 15, 1863.
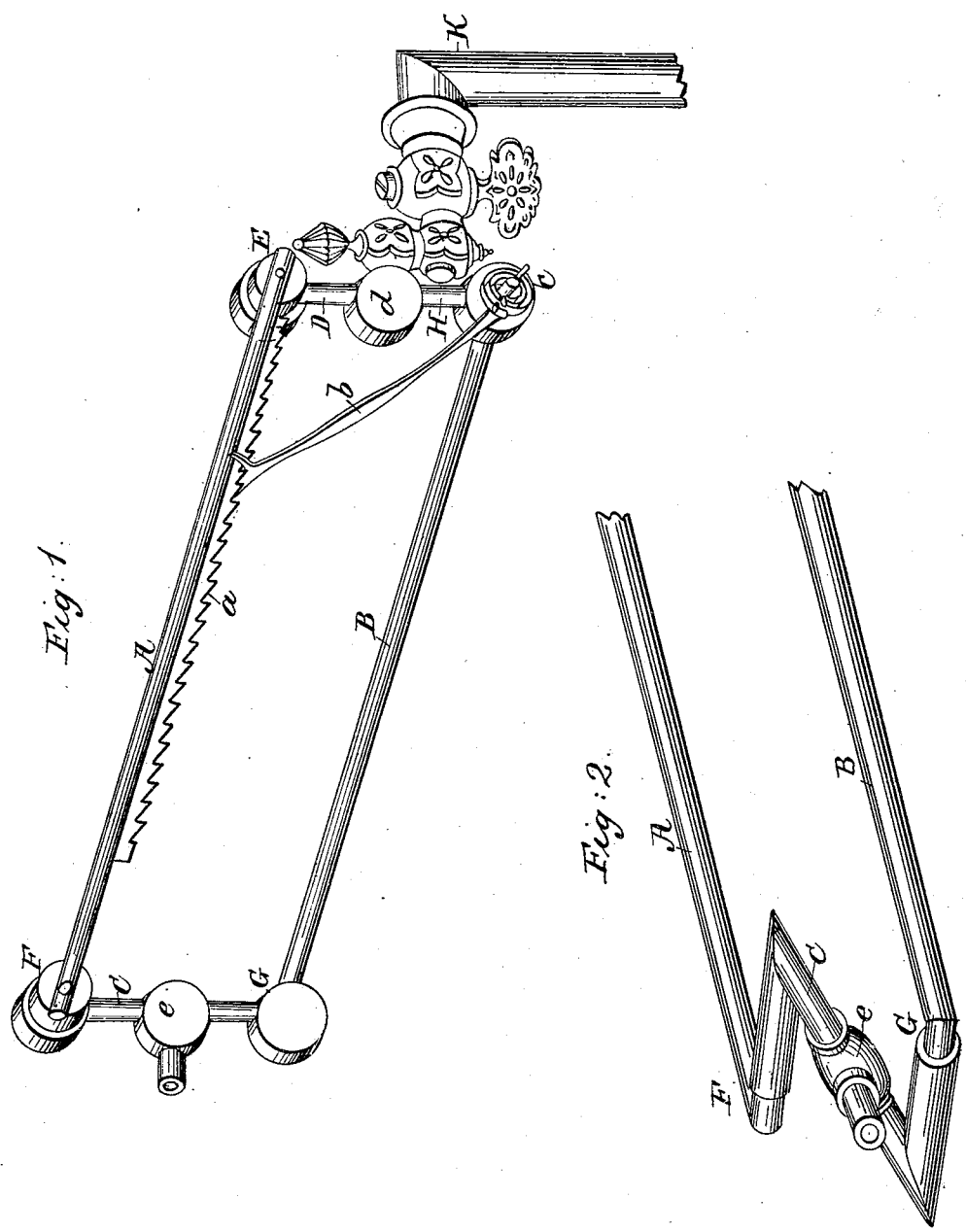

UNITED STATES PATENT OFFICE.

CHARLES MONSON, OF NEW HAVEN, CONNECTICUT.

IMPROVEMENT IN BRACKETS FOR LAMP OR GAS LIGHTS.

Specification forming part of Letters Patent No. 39,945, dated September 15, 1863; antedated July 4, 1862.

*To all whom it may concern:*

Be it known that I, CHARLES MONSON, of the city and county of New Haven, in the State of Connecticut, have invented a new and useful Improvement in Adjustable Brackets for Gas or Lamps; and I do hereby declare that the following is a full, clear, and exact description of the construction, character, and operation of the same, reference being had to the accompanying drawings, which make part of this specification, in which—

Figure 1 is a perspective view of the bracket complete, with common joints. Fig. 2 is a perspective view of the Z-shaped vertical connecting part, showing the insertion conduit joints.

My improvement on J. R. Hunter's patent (issued October 30, 1855) consists in making each of the long or horizontal tubes of the parallelogram with a short elbow (or a curve, or equal to a right angle) at each end, and the short or vertical tubes of the Z shape, or any analogous form, which will allow the extremities of the long tubes to enter from opposite sides to form insertion conduit-joints, and so that the parallelogram may be turned entirely over, if need be, and in attaching longitudinally to the under side of the upper tube a rack, so that by means of a suitable ratchet or click the light may be sustained at any desired elevation. I make the parallelogram or parallel arrangement of two long tubes, A and B, Fig. 1, and two short Z-shaped connecting-tubes, (one of which is shown at C, Fig. 2,) of brass tubing, or any other suitable conduits, and connect them at the four angles by insertion conduit-joints, as shown at E and F, Fig. 2, or of any analogous form. On the under side of the upper tube, A, I attach longitudinally a ratchet-toothed rack, as shown at *a*, Fig. 1; and I use a suitable ratchet or click, as shown at *b*, Fig. 1, to sustain the light at the desired elevation, and I bring up this click *b* into the rack *a* by means of a spiral or volute spring, *c*, or by any other suitable means. In the central part of each of the Z-shaped or vertical tubes I have an enlargement—by one of which the parallelogram is to be attached to the supply pipe, and to the other the burner or lamp is to be attached.

This bracket may be used either projecting from a vertical wall or pendent from a descending supply-pipe.

Instead of the two tubes A and B, one may be a solid bar.

The advantages of my improvement consist in that the insertion conduit joint will work freely and be gas-tight for a much longer time than any other joint, and in that the friction of the joints (as claimed by Hunter) cannot be depended on after a little use, and while it is secure the joints must be inconveniently stiff and the bracket liable to be broken by changing the elevation of the light, (one reason, probably, why Hunter's bracket has never come into use,) while my joints will be gas-tight, and yet work so freely that the friction will not support the weight of the bracket, so that there is never much strain on the joints.

I am aware that the parallel arrangement for gas-light brackets has been before known. I therefore do not claim it as such; but

What I claim as my invention, and desire to secure by Letters Patent, is—

1. The use of the parallel tubes, as A and B, in combination with Z shaped tubes, as C, Fig. 2, or tbues of any analogous form, so as to use insertion conduit-joints, when the whole is constructed, arranged, and fitted for use substantially as herein described.

2. The use of the rack *a* and ratchet or click *b*, for sustaining the light at the desired elevation, in combination with the parallelogram, substantially as set forth.

CHARLES MONSON.

Witnesses:
 H. KEATING,
 R. FITZGERALD.